(12) United States Patent
Furukawa (10) Patent No.: US 8,074,067 B2
(45) Date of Patent: Dec. 6, 2011

(54) MEMBER CERTIFICATE ACQUIRING DEVICE, MEMBER CERTIFICATE ISSUING DEVICE, GROUP SIGNING DEVICE, AND GROUP SIGNATURE VERIFYING DEVICE

(75) Inventor: Jun Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1059 days.

(21) Appl. No.: 11/815,848

(22) PCT Filed: Jan. 16, 2006

(86) PCT No.: PCT/JP2006/300428
§ 371 (c)(1),
(2), (4) Date: Aug. 8, 2007

(87) PCT Pub. No.: WO2006/085430
PCT Pub. Date: Aug. 17, 2006

(65) Prior Publication Data
US 2009/0074188 A1    Mar. 19, 2009

(30) Foreign Application Priority Data
Feb. 10, 2005 (JP) ................................. 2005-034961

(51) Int. Cl.
*H04L 29/06* (2006.01)
(52) U.S. Cl. ............ 713/156; 380/23; 380/30; 380/286; 713/158; 705/69; 705/74
(58) Field of Classification Search .................... 713/156
See application file for complete search history.

(56) References Cited

U.S. PATENT DOCUMENTS
5,867,578 A * 2/1999 Brickell et al. ............... 713/180
(Continued)

FOREIGN PATENT DOCUMENTS
JP    9-6236    1/1997
(Continued)

OTHER PUBLICATIONS

Dan Boneh, Xavier Boyen, Hovey Shacham; Short Group Signatures; Advances in Cryptology-CRYPTO 2004, Springer-Verlag; pp. 1-19.*

(Continued)

*Primary Examiner* — Taghi Arani
*Assistant Examiner* — Mahfuzur Rahman
(74) *Attorney, Agent, or Firm* — Dickstein Shapiro LLP (57) ABSTRACT

It is an object of the present invention to enhance the security and reduce the data amount of data to be handled in a group signing system, in which when the group public key which includes: a description for four groups: group 1, group 2, group T, and group E of the same order number; a description of bilinear mapping from group 1 and group 2 to group T; each generator of group 1, group 2, group T, and group E; and a signature public key of a signature scheme using group 1, group 2, and group T, is input, the member secret key including an integer not larger than the order number, member evidence which is a value given by multiplying the generator of group E by the member secret key, and an element of group 1 or group 2 which is a value given by multiplying the generator of the group 1 or the group 2 by the member secret key are sent to the member-certificate issuing device, and thereafter upon receipt of a signature for the member secret key, which is verifiable by the signature public key, from the member-certificate issuing device, the signature is used as the member certificate.

9 Claims, 8 Drawing Sheets

U.S. PATENT DOCUMENTS

| | | | |
|---|---|---|---|
| 5,901,229 A * | 5/1999 | Fujisaki et al. | 380/30 |
| 6,446,205 B1 | 9/2002 | Lenstra | |
| 6,530,020 B1 * | 3/2003 | Aoki | 713/163 |
| 6,697,946 B1 * | 2/2004 | Miyaji | 713/180 |
| 6,986,044 B1 * | 1/2006 | Inada | 713/170 |
| 7,377,947 B2 | 5/2008 | Merker et al. | |
| 7,533,270 B2 * | 5/2009 | Gentry | 713/180 |
| 7,543,139 B2 * | 6/2009 | Camenisch et al. | 713/156 |
| 7,571,324 B2 * | 8/2009 | Canard et al. | 713/180 |
| 7,590,236 B1 * | 9/2009 | Boneh et al. | 380/30 |
| 7,673,144 B2 * | 3/2010 | Arditti Modiano et al. | 713/176 |
| 7,711,113 B2 * | 5/2010 | Takahashi | 380/30 |
| 7,711,120 B2 * | 5/2010 | Kimmel et al. | 380/279 |
| 2001/0009026 A1 * | 7/2001 | Terao et al. | 713/170 |
| 2003/0120931 A1 * | 6/2003 | Hopkins et al. | 713/180 |
| 2003/0177352 A1 * | 9/2003 | Camenisch et al. | 713/158 |

FOREIGN PATENT DOCUMENTS

| | | |
|---|---|---|
| JP | 2000-40044 | 2/2000 |
| JP | 2000-148012 | 5/2000 |
| JP | 2001-166687 | 6/2001 |
| JP | 2002-207694 B | 7/2002 |
| JP | 2003-298576 | 10/2003 |
| JP | 2004-221800 | 8/2004 |
| JP | 2004-228958 | 8/2004 |
| JP | 2004-320562 | 11/2004 |
| JP | 2005-179646 A | 7/2005 |
| JP | 2006-295184 A | 10/2006 |
| KR | 2002-0087896 | 11/2002 |
| WO | WO-02/00759 A1 | 1/2002 |

OTHER PUBLICATIONS

Advances in Cryptology—CRYPTO 2004, Lecture Note in Computer Science 3152, Springer, pp. 41-55 (2004).

Ozaki et al., "An Efficient Group Signature Schemes with Pairing Over Elliptic Curves", The 2003 Symposium on Cryptography and Information Security, The Institute of Electronics, Information and Communication Engineers, Hamamatsu, Japan (Jan. 26-29, 2003).

Boneh et al., "Short Group Signatures", CRYPTO 2004, LNCS 3152, pp. 1-19 (2004).

Boneh et al., "6 Short Group Signatures from DSH", Short Group Signatures, CRYPTO 2004, LNCS 3152 (2004).

Camenisch et al., "Signature Schemes and Anonymous Credentials from Bilinear Maps", CRYPTO 2004, LNCS 3152 (2004).

Bussard et al., "Untraceable Secret Credentials: Trust Establishment with Privacy", Pervasive Computing and Communications Workshops, Proceedings of the Second IEEE Annual Conference in Piscataway, NJ, U.S.A., XP010689740, pp. 122-226 (Mar. 2004).

Okazaki, Hiroyuki et al.; "An efficient group signature schemes with pairing over elliptic curves"; Symposium on Coding and Information Security (SCIS2003) Bulletin, CD-Rom, Japan, Jan. 26, 2003; 5C vol. 4, 5C-3.

Camenisch, Jan, et al.; "Signature Schemes and Anonymous Credentials from Bilinear Maps"; LNCS, Advances in Cryptology-CRYPTO 2004, Aug. 2004, vol. 4=3152, pp. 56-72.

* cited by examiner

MEMBER CERTIFICATE ACQUIRING DEVICE, MEMBER CERTIFICATE ISSUING DEVICE, GROUP SIGNING DEVICE, AND GROUP SIGNATURE VERIFYING DEVICE

TECHNICAL FIELD

The present invention relates to a group signing system which creates and verifies a signature for certifying that a member belonging to a group is a member of the group, and particularly to a group signing system which utilizes bilinear mapping.

BACKGROUND ART

Related art of group signature which use bilinear mapping includes a group signature described in Dan Boneh, Xavier Boyen: "Short Group Signature: Advances in Cryptology—CRYPTO 2004," Lecture Notes in Computer Science 3152, pp. 41-55, 2004, Springer. The outline of this group signature will be described below.

Let a randomly selected unknown $\gamma$ of a field $Z/pZ$ with p being a prime number be the group secret key.

Let a letter string which describes: the prime number p; group 1, group 2 and group T which are of order number p; a bilinear map e from group 1 and group 2 to group T; an isomorphic map $\phi$ from group 2 to group 1; and a hash function Hash for mapping a letter string to field $(Z/pZ)$, a generator $G_2$ of group 2, a generator $G_1$ of group 1 where $\phi(G_2)=G_1$, a randomly selected unknown H of group 1, and $W=[\gamma]G_2$ be the group public key.

Where, W is the point of $\gamma$ times $G_2$.

Further, let randomly selected two points $\xi_1$, $\xi_2$ on field $Z/pZ$ be the tracking secret key.

Let randomly selected two points on group 2 in which $[\xi_1]U=[\xi_2]V=H$ be the tracking public key. And let a randomly selected point x on field $Z/pZ$ be the member secret key.

Further, Let a randomly selected point y on field $Z/pZ$ and A where $A=[1/(\gamma+y)]([1-x]G_1)$ be the member certificate.

Hereinafter, the group signing device will be described.

The group signing device is input with a message to be signed, a group public key, a tracking public key, a member secret key, a member certificate, and a random number.

The group signing device randomly selects points $\alpha$ and $\beta$ on $Z/pZ$ using an input random number and generates encrypted text, $T_1=[\alpha]U$, $T_2=[\beta]V$, $T_3=[\alpha+\beta]H$.

The group signing device further randomly selects points $\alpha'$, $\beta'$, $\delta'_1$, $\delta'_2$, and y' on $Z/pZ$ using an input random number, and generates a commitment, $R_1=[\alpha']U$, $R_2=[\beta']V$, $R_3=e(T_3, G_2)\hat{}(x')\cdot e(H,W)\hat{}(-\alpha'-\beta')\cdot e(H,G_2)\hat{}(-\delta'_1-\delta'_2)\cdot e(H,G_2)\hat{}(y')$, $R_4=[x']T_1-[¥delta'_1]U$, $R_5=[x']T_2-[¥delta'_2]V$, where symbol [ˆ] means a power modulo operation.

The group signing device generates a hash value of a group public key, a tracking public key, a message, and $U,V,T_1,T_2,T_3,R_1,R_2,R_3,R_4,R_5$ to use as challenge value c.

The group signing device generates a response, $s\alpha=\alpha'+c\alpha$, $s\beta=\beta'+c\beta$, $s_x=x'+cx$, $s\delta_1=\delta'_1+cx\alpha$, $s\delta_2=cx\beta$, $s_y=y'+xy$.

The group signature outputs $T_1,T_2,T_3,c,s\alpha,s\beta,s_x,s\delta_1,s\delta_2,s_y$ as the group signature for message m.

Hereinafter, the group-signature verifying device will be described.

The group-signature verifying device is input with a signed message, a group public key, and a tracking public key.

The group-signature verifying device generates $R_1=[s\alpha]U-[c]T_1$, $R_2=[s\beta]V-[c]T_2$, $R_3=e(T_3,G_2)\hat{}(s_x)\cdot e(H,W)\hat{}(-s\alpha-s\beta)\cdot e(H,G_2)\hat{}(-s\delta_1-s\delta_2)\cdot e(H,G_2)\hat{}(s_y)(e(G_1,G_2)/e(T_3,W))\hat{}$ (c), $R_4=[s_x]T_1-[s\delta_1]U$, $R_5=[s_x]T_2-[s\delta_2]U$, and generates a hash value of the group public key, the tracking public key, the signed message and $U,V,T_1,T_2,T_3,R_1,R_2,R_3,R_4,R_5$ to verify if this corresponds to challenge value c. If there is a correspondence, it is judged that the group signature is valid and, if not, invalid.

DISCLOSURE OF THE INVENTION

A first problem in the above described related art is that the security of the encrypted text used in the group signature relies on the assumption that it is difficult to solve the linear Diffie-Hellman discrimination problem. Therefore, the security of the entire group signing system also relies on this assumption. This assumption has been firstly proposed in the above mentioned reference to demonstrate the security of the proposed group signature, and few have attempted to solve this problem. Therefore, it is highly likely that a solution will be found in the near future, and thus the above mentioned proposed group signature may not provide sufficient security.

A second problem is that the security of the encrypted text used in the group signature relies on a generic group mode as well as on the assumption that it is difficult to solve the linear Diffie-Heliman discrimination problem. The security of a scheme in which security is provided by this general group is based on nothing more than a prediction, so that even in cases where security is provided by the general group model, in reality, dangerous encryption schemes may still occur. Therefore, it is likely that a solution will be proposed in the near future, and the proposed group signature may not provide sufficient security.

A third problem is that there are large amount of calculation and signature data. In order to make the group signature easier to use, it is desirable to reduce the amount of calculation and signature data.

The member-certificate acquiring device of the present invention, which is input with a group public key and a random number, and outputs a member certificate and a member secret key by communicating with a member-certificate issuing device, is characterized in that when input with the group public key which includes: a description for four groups: group 1, group 2, group T, and group E, of the same order number; a description of bilinear mapping from group 1 and group 2 to group T; each generator of group 1, group 2, group T, and group E; and a signature public key of a signature scheme using the group 1, the group 2, and the group T, the member-certificate acquiring device sends to the member secret key including an integer not larger than the order number; member evidence which is a value given by multiplying the generator of the Group E by the member secret key; and an element of the group 1, group 2, which is a value given by multiplying the generator of group 1 or group 2 by the member secret key, and thereafter upon receipt of a signature for the member secret key, which is verifiable by the signature public key, from the member certificate issuing device, uses the signature as the member certificate.

The member-certificate issuing device of the present invention, which is input with a group public key, a group secret key and a random number and which outputs a member evidence for use in identifying a member by communicating with a member-certificate acquiring device, is characterized in that the member-certificate issuing device is input with the group public key which includes: a description for four groups: group 1, group 2, group T, and group E, of the same order number; a description of bilinear mapping from group 1 and group 2 to group T; each generator of group 1, group 2, group T, and group E; and a signature public key of a signature scheme using group 1, group 2, and group T, and the group secret key which includes a signature secret key corresponding to the signature public key of a signature scheme using group 1, group 2, and group T, and upon receipt of a member evidence which is a value given by multiplying the generator of the group E by the member secret key, and an element of group 1 or group 2 which is a value given by multiplying the generator of group 1 or group 2 by the member secret key from the member-certificate acquiring device, generates a signature for the member secret key using the signature secret key to send the signature to the member-certificate acquiring device as the member certificate.

The group signing device of the present invention is a group signing device, which is input with a group public key, a tracking public key, a member certificate, a member secret key, and a message and outputs a group signature for the message, characterized in that the group signing device comprises an encryption device for creating an encrypted text in which part of the member evidence generated from the member secret key is encrypted by a tracking public key from: the group public key including a description for four groups: group 1, group 2, group T, and group E, of the same order number, a description of bilinear mapping from group 1 and group 2 to group T, each generator of group 1, group 2, group T, and group E, a signature public key of a signature scheme utilizing group 1, group 2, and group T; the tracking public key comprising an element of the group E; and the member secret key.

In the above described case, the group signing device may comprise a knowledge-proof-statement generating device which generates a knowledge proof statement which is data for proving that a secret key encrypted into the encrypted text and a signature for the aforementioned secret key can be calculated from input data, and the group signature to be output may include a knowledge proof statement by the knowledge-proof-statement generating device.

Further, the above described knowledge-proof-statement generating device may comprise:

a commitment generating device, which is input with the group public key, the tracking public key, the member secret key, the member certificate, and the random number, and generates a commitment to encryption which is data for proving knowledge of a random number for encryption, and a commitment to member certificate which is data for proving knowledge of signature and member secret key, to output the commitment to encryption and the commitment to member certificate as a commitment;

a challenge-value generating device which is input with the group public key, the tracking public key, the encrypted text, and the commitment and which outputs a hash value of the foregoing values as a challenge value; and a response generating device which is input with the group public key, the member secret key, the member certificate, the random number, and the challenge value and which outputs a response of encryption and a response of member certification as a response.

Furthermore, the above described group signature may comprise the above described encrypted text, the above described commitment, and the above described response.

Furthermore, the above described group signature may comprise the above described encrypted text, the above described challenge value, and the above described response.

The group-signature verifying device of the present invention into which is input with a group public key, a tracking public key, a message and a group signature, when input with a group public key which includes a description for four groups: group 1, group 2, group T, and group E, of the same order number, a description of bilinear mapping from group 1 and group 2 to group T, each generator of group 1, group 2, group T, and group E, and a signature public key of the signature scheme using the group 1, the group 2, and the group T; a tracking public key comprising an element of the group E; and a group signature including an encrypted text in which part of member evidence generated by a member secret key is encrypted by a tracking public key, judges if the above described group signature is a valid group signature for the message to output "valid" or "invalid."

In the above described case, the group-signature verifying device may comprise a knowledge-proof-statement verifying device which verifies that a knowledge proof statement is data to prove that a secret key which is used to generate part of member evidence encrypted into the above described encrypted text, and a signature for the secret key can be calculated from data input into the group signing device and from data included in the group signing device, and the above group signature may include a knowledge proof statement which has been verified by the proof-statement verifying device.

Moreover, the group signature may comprise the above described encrypted text, the above described commitment, and the above described response; and the above described knowledge-proof-statement verifying device may comprise:

a challenge-value generating device which is input with the above described group public key, the above described tracking public key, the above described encrypted text, and the above described commitment, and outputs a hash value of the foregoing values as a challenge value; and a response verifying device which is input with the above described group public key, the above described tracking public key, the above described encrypted text, the above described commitment, the above described challenge value, and the above described response and outputs "valid" or "invalid" depending on whether or not these inputs satisfy a given equation, wherein the output of the response verifying device may be output as the output of the group-signature verifying device.

Moreover, the above described group signature may comprise the above described encrypted text, the above described challenge value, and the above described response, and the above described knowledge-proof-statement verifying device comprises:

a commitment generating device which is input with the above described group public key, the above described tracking public key, the above described response, and the above described challenge value, and outputs a commitment to encryption and a commitment to member certificate as a commitment; and a response verifying device which is input with the above described group public key, the above described tracking public key, the above described encrypted text, and the above described commitment, and outputs "valid" or "invalid" depending on whether or not a hash value of the foregoing values corresponds to the above described challenge value; wherein the output of the above described response verifying device may be output as the output of the group-signature verifying device.

The tracking device of the present invention is input with a group public key, a tracking public key, a group signature, and a tracking secret key, and decrypts the encrypted text of part of the member evidence generated from a member secret key contained in the group signature to output the part of member evidence which is a value uniquely determined from the member secret key.

The group signing system of the present invention, which comprises the above described member-certificate acquiring device, a member-certificate issuing device, a group signing device, a group-signature verifying device, and a tracking device, is characterized in that the above described member-certificate acquiring device, which communicates with the above described member-certificate issuing device to acquire a member certificate and a member secret key; inputs the acquired member certificate, the acquired member secret key, a message, a group public key, and a tracking public key into the above described group signing device to acquire a group signature for the above described message; and inputs the above described message and the acquired group signature into the above described group-signature verifying device to verify that the acquired group signature is a valid group signature for the above described message and to input the above described group signature into the above described tracking device thereby outputting a member evidence representing the member which has generated the group signature.

In order to solve the first problem, the method of the present invention utilizes, in addition to group 1, group 2, and group T; a group T in which no bilinear map exists so as to use an ElGamal encrypted text in this group in place of the encrypted text used in the above described reference. The security of such ElGamal encrypted text relies on the difficulty in solving the Diffie-Hellman discrimination problem. The method of solving this problem has been studied for many years and therefore it is reasonable to consider that the problem is sufficiently difficult to solve.

In order to solve the second problem, the method of the present invention utilizes not just ElGamal encrypted text, but an ElGamal-type encrypted text which is secure against selective attacks on an encryption text.

For the third problem, it is found that adopting the methods for solving the above described two problems would make the group signing method of the present invention more effective than related techniques.

According to the present invention, the grounds for security do not rely on the assumption that it is difficult to solve the linear Diffie-Hellman discrimination problem. Moreover, they do not rely on the generic group model. For these reasons, it is possible to create and verify a more secure group signature.

The amount of calculation and the signature length required by the group signing device and the group-signature verifying device used in the present invention are compared with those of the related arts as follows.

In the present invention, the numbers of times of scalar multiplication on group E or group 1, group 2; power modulo operation; and the calculation of bilinear map on group T, which are required by the group signing device, are respectively 7, 4 and 1, and those required by the verifying device are 6, 5 and 2. Further, the signature length is 10 times the length of p.

In the method of related art, the scalar multiplication of group E or group 1, group 2; power modulo operation and calculation of bilinear map on group T, which are required by the group signing device, are respectively 13, 4 and 1, and those required by the verifying device are 12, 5 and 2. Also, the signature length is 12 times the length of p.

So far as specifically described, the present invention is more effective than the method of related art.

DESCRIPTION OF SYMBOLS

100 Member-certificate acquiring device
101 Group public key
102 Random number
103 Member-evidence generating device
104 Member evidence
107 Member secret key
108 Commitment generating device
109 Commitment
111 Challenge acquiring device
112 Challenge value
113 Response generating device
114 Response
116 Member certificate source
117 Member-certificate-source verifying device
119 Member certificate
200 Member-certificate issuing device
209 Group secret key
210 Member secret key
202 Member-evidence acquiring device
205 Challenge generating device
207 Response verifying device
208 Member-certificate-source generating device
300 Group signing device
301 Tracking public key
302 Message
303 Random number
313 Group signature
303 Encryption device using group E
304 Member-evidence encrypted text
306 Commitment generating device
307 Commitment
308 Challenge-value generating device
309 Challenge value
310 Response generating device
311 Response
312 Group-signature output device
500 Group-signature verifying device
502 Commitment generating device
503 Commitment
504 Challenge-value generating device
505 Challenge value
506 Response device 700 Tracking device
701 Tracking secret key
702 Random number
703 Decryption device using group E
704 Part of member evidence
704' Member evidence
706 Commitment generating device
707 Commitment
708 Challenge-value generating device
709 Challenge value
710 Response generating device
711 Response
712 Output device
713 Decryption validity proof

BEST MODE FOR CARRYING OUT THE INVENTION

An exemplary embodiment of the present invention will be described in detail with reference to the appended drawings.

First, the assumed conditions will be described.

p is a prime number.

Group 1, group 2, group T, and group E are each a group of order p.

It is assumed that there is a bilinear map e from group 1 and group 2 to group T.

Group E is a group on which it is difficult to solve the Diffie-Heliman discrimination problem by a multiplicative group on a prime field or a general elliptic curve.

φ is an isomorphic map from group 2 to group 1.

Hash is a hash function which maps a letter string to field (Z/pZ).

$G_2$ is a generator of group 2, and $G_1$ is a generator of group 1 where $\phi(G_2)=G_1$.

G is a generator of group E.

H and K are randomly selected unknowns of group 1.

γ is a randomly selected unknown of field Z/pZ.

$Y=[\gamma]G_2$ s and t are randomly selected two points on field Z/pZ.

S and T are S=[s]G, T=[t]G.

The group secret key is γ.

The group public key is a letter string, which describes p, group 1, group 2, group T, bilinear map e, isomorphic map φ, and hash function Hash, and $G_1, G_2, G, H, K, Y$.

The tracking secret key is (s,t).

The tracking public key is (S,T).

Emobidment 1

Member-Certificate Acquiring Device 100

Figure 1:
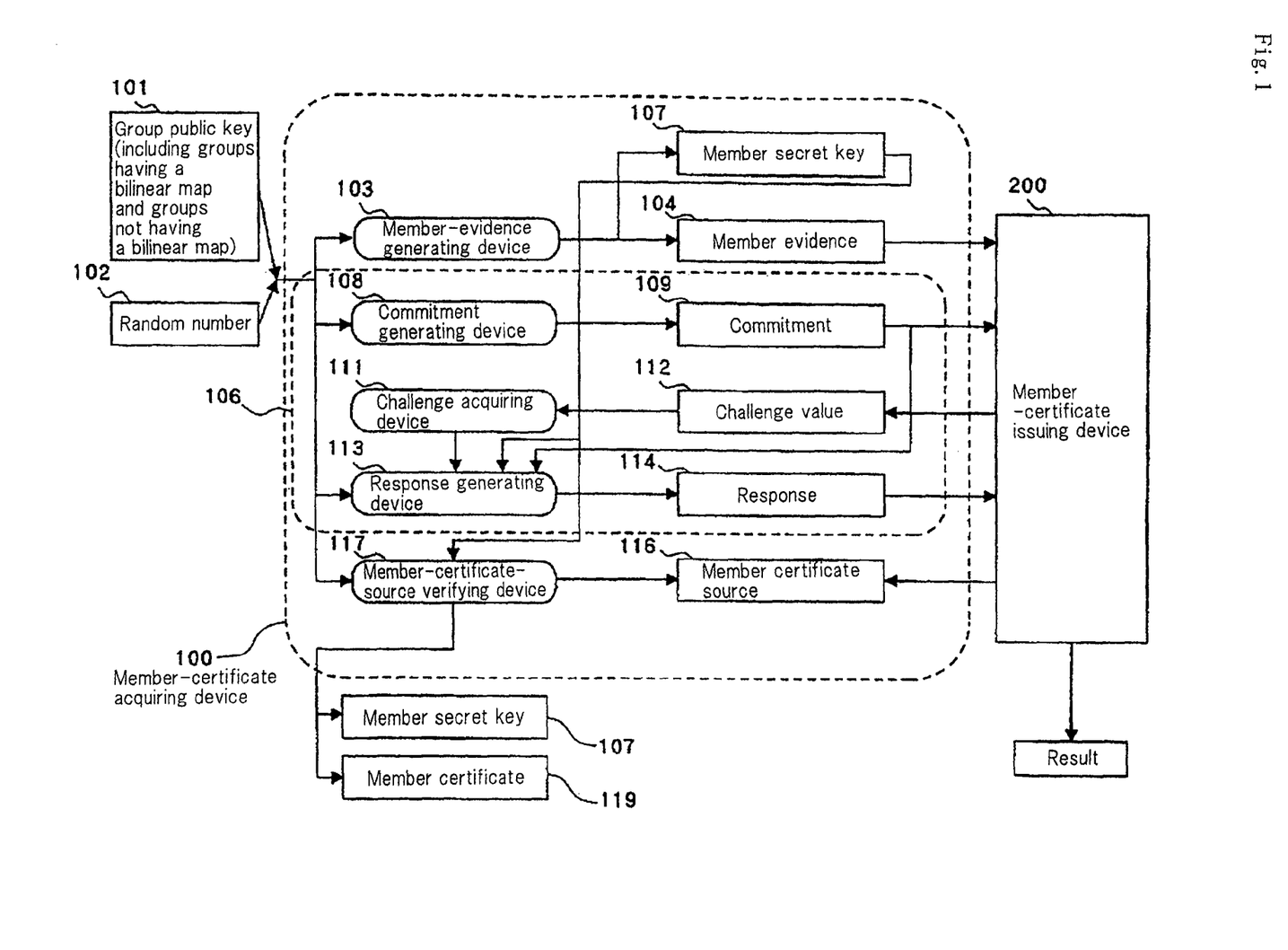
FIG. 1 shows the configuration of the member-certificate acquiring device according to embodiment 1 of the present invention.

FIG. 1 is a block diagram to show the configuration of member-certificate acquiring device 100 according to the present invention.

Member-certificate acquiring device 100, which transmits/receives to/from member-certificate issuing device 200 to input group public key 101 and random number 102 and to output member secret key 107 and member certificate 119, comprises member-evidence generating device 103, commitment generating device 108, challenge acquiring device 111, response generating device 113, and member-certificate-source verifying device 117. Member-certificate acquiring device 100 sends member evidence 104, commitment 109, and response 114 to member-certificate issuing device 200 during the course of communication with member-certificate issuing device 200, and receives challenge value 112 and member certificate source 116.

Moreover, member-certificate acquiring device 100 is made up of a general-purpose computer system which includes an input device, an output device, a storage device, and a control device, wherein member evidence 104, member secret key 107, commitment 109, challenge value 112, response 114, and member certificate source 116 are stored in memory. Moreover, devices other than these are virtually configured in the computer system. Further, procedure 106 described below is performed by using commitment generating device 108, commitment 109, challenge acquiring device 111, challenge value 112, response generating device 113, and response 114 out of the above described constituents.

Member-certificate acquiring device 100 is input with group public key 101 and random number 102. Member-evidence generating device 103 randomly selects member secret key 107 ($x_U$) on field (Z/pZ) from input random number 102; and then from $x_U$, generates $$Q_U=[x_U]G$$

$$H_U=[x_U]H+[z'_U]K.$$

This is called member evidence 104, and $(Q_U, H_U)$ is sent to member-certificate issuing device 200.

According to the procedure 106 described below, knowledge of $(x_U, z'_U)$ which satisfies following two equations, $$Q_U=[x_U]G$$

$$H_U=[x_U]H+[z'_U]K$$

is proved for the member-certificate issuing device.

[Start of Procedure 106]

Commitment generating device 108 randomly selects $x'_U$, $z'$ from field (Z/pZ) from random number 102 which has been input, and generates commitment 109 that has the content described below to send to member-certificate issuing device 200.

$$Q'_U=[x'\_U]G$$

$$H'_U=[x'\_U]H+[z']K$$

Thereafter, member-certificate acquiring device 100 waits for challenge value 112 ($c_U$), which is an unknown of field Z/pZ, to be sent from member-certificate issuing device 200.

Upon receipt of challenge value 112 ($c_U$), response generating device 113 calculates response 114 shown below and sends it to member-certificate issuing device 200.

$$r_U=c_U x_U + x'_U$$

$$s_U=c_U z'_U + z'$$

[End of Procedure 106]

Thereafter, member-certificate acquiring device 100 waits for member certificate source 116 having a content shown below to be sent from member-certificate issuing device 200.

$$y_U \in Z/pZ,$$

$$z''_U \in Z/pZ,$$

$$A_U \in \text{group 1}$$

Upon receipt of the above values, member-certificate-source verifying device 117 calculates $$z_U = z'_U + z''_U$$

and after verifying that the following equation $$e(A_U, Y+[y_U]G_2) \cdot e([x_U]H, G_2) \cdot e([z_U]K, G_2) = e(G_1, G_2)$$

is satisfied, uses $(A_U, y_U, z_U)$ as member certificate 119 and outputs $x_U$ as member secret key 107.

Emobidment 2

Member-Certificate Issuing Device 200

Figure 2:
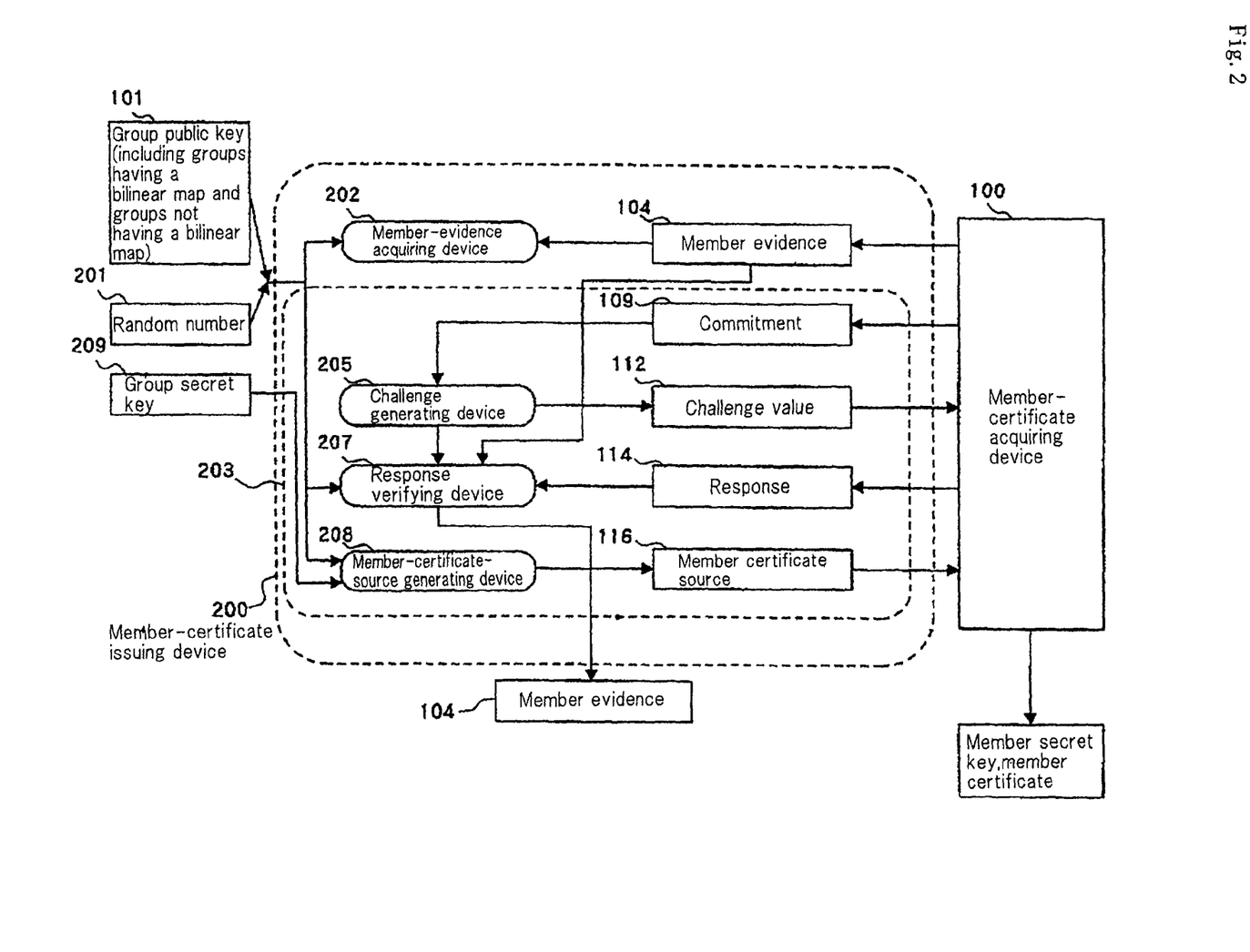
FIG. 2 shows the configuration of the member-certificate issuing device in embodiment 2 of the present invention.

FIG. 2 is a block diagram to show the configuration of member-certificate issuing device 200 according to the present invention.

Member-certificate issuing device 200, which transmits/receives to/from member-certificate acquiring device 100 to input group public key 101, random number 102 and group secret key 209 and to output member evidence 104, comprises challenge generating device 205, response verifying device 207, member-certificate-source generating device 208, and member-evidence acquiring device 202. Member-certificate issuing device 200 sends challenge value 112 and member certificate source 116 to member-certificate acquiring device 100 and receives member evidence 104, commitment 109 and response 114 during the course of communication with member-certificate acquiring device 100.

Further, member-certificate issuing device 200 is made up of a general-purpose computer system which includes an input device, an output device, a storage device and a control device, wherein member evidence 104, commitment 109, challenge value 112, response 114, member certificate source 116 are stored in memory. Moreover, devices other than these are virtually configured in the computer system. Moreover, procedure 203 described below is performed by using commitment 109, challenge value 112, response 114, member certificate source 116, challenge generating device 205, response verifying device 207, and member-certificate-source generating device 208 from among the above described constituents.

Member-certificate issuing device 200 is input with group public key 101, group secret key 209, and random number 201 and, upon start of operation, waits for member evidence 104 $(Q_U, H_U) \in$ (group E, group 1) to be sent from member-certificate acquiring device 100.

When member evidence 104 is sent from member-certificate acquiring device 100, it is verified through procedure 203 that member-certificate acquiring device 202 retains knowledge of $x_U, z'_U$ which satisfies the following two equations.

$$Q_U = [x_U]G$$

$$H_U = [x_U]H + [z'_U]K$$

[Start of Procedure 203]

Challenge generating device 205 waits for commitment 109 $((Q'_U, H'_U) \in$ (group E, group 1)) to be sent from member-certificate acquiring device 100.

When commitment 109 is sent, from input random number 201, challenge generating device 205 randomly selects challenge value 112 ($c_U$) from field ($Z/pZ$) to send to member-certificate acquiring device 100.

Thereafter, when response 114 $((r_U, s_U) \in (Z=pZ)^{2)}$ is sent from member-certificate acquiring device 100, response verifying device 207 verifies that $$[r_U]G = [c_U]Q_U + Q'_U$$

$$[r_U]H + [s_U]K = [c_U]H_U + H'_U$$

are satisfied.
[End of Procedure 203]

Member-certificate-source generating device 208 selects $(y_U, z''_U) \in (Z/pZ, Z/pZ)$ from the input random number to generate $A_U = [1/(\gamma + y_U)](G_1 - H_U - [z''_U]K$ and sends $(A_U, y_U, z''_U)$ to member-certificate acquiring device 100 as member certificate source 116.

Member evidence 104 ($Q_U$) is output.

Emobidment 3

Group Signing Device 300

Figure 3:
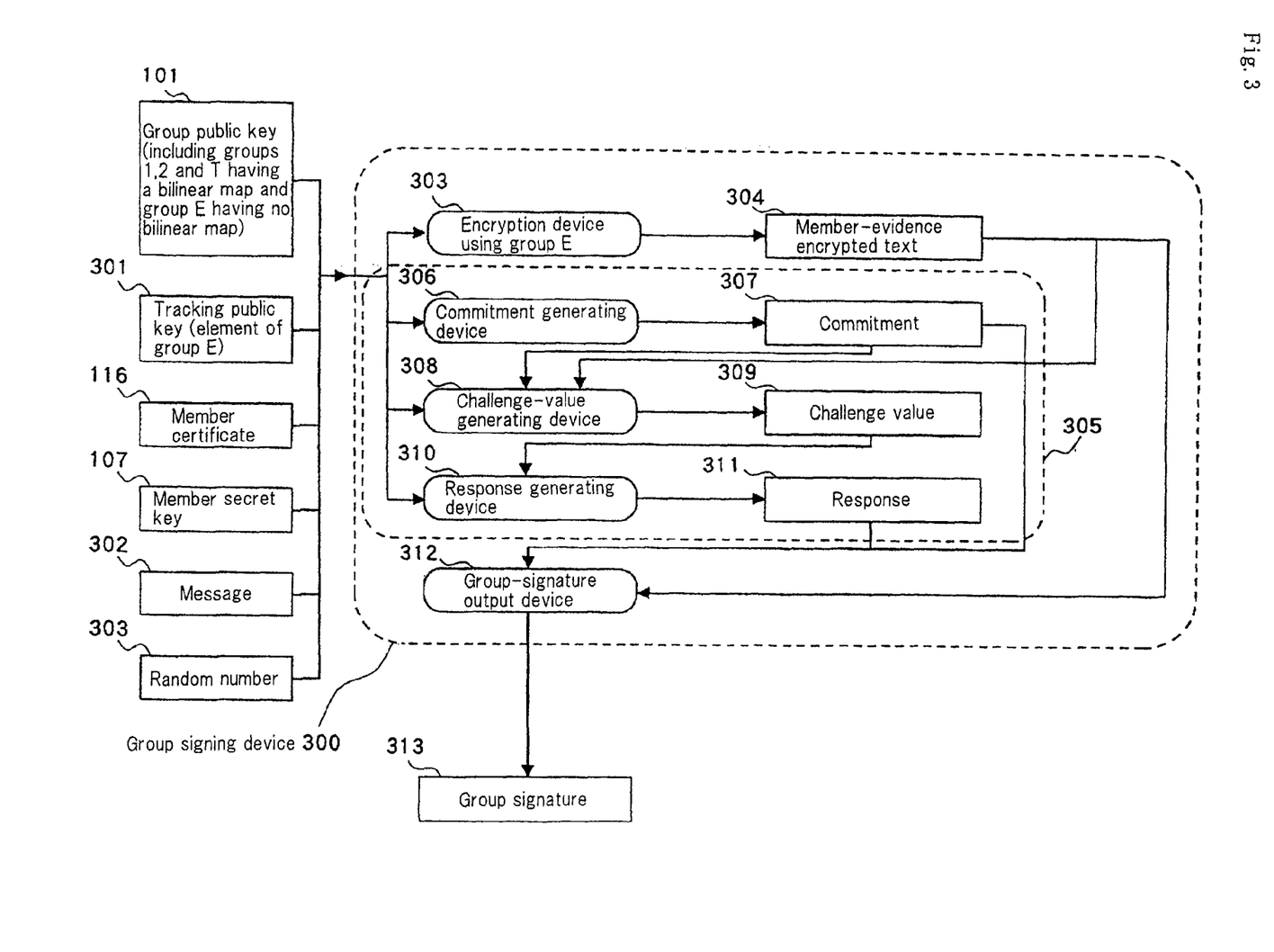
FIG. 3 shows the configuration of the group signing device in embodiment 3 of the present invention.

FIG. 3 is a block diagram to show the configuration of group signing device 300 according to the present invention.

Group signing device 300, which is input with group public key 101, group secret key 107, member certificate 116, tracking public key 301, message 302, and random number 303, and outputs group signature 313, comprises encryption device 303 using group E, member-evidence encrypted text 304, commitment generating device 306, commitment 307, challenge-value generating device 308, challenge value 309, response generating device 310, response 311, group signature output device 312.

Moreover, group signing device 300 is made up of a general-purpose computer system which includes an input device, an output device, a storage device and a control device, wherein member-evidence encrypted text 304, commitment 307, challenge value 309, and response 311 are stored in memory. Moreover, devices other than these are virtually configured in the computer system. Further, knowledge-proof-statement generating device 305 is made up of commitment generating device 306, commitment 307, challenge-value generating device 308, challenge value 309, response generating device 310, and response 311 from among the above described constituents.

Group signing device 300 is input with group public key 101, tracking public key 301, member certificate 116, member secret key 107, message 302 ($m$), and random number 303.

Encryption device 303 using group E randomly selects $q, r$ from field $Z/pZ$ and generates encrypted text 304 having following content.

$$B = A_U + [q]K$$

$$U = [x_U + r]G$$

$$V = [r]S$$

$$W = [r]T$$

Successively, the following processing is performed in knowledge-proof-statement generating device 305. This processing provides proof of knowledge of $(A_U, y_U, z_U, x_U, q, r)$.
[Start of Knowledge-Proof-Statement Generation]
By using commitment generating device 306, t,u,v,w,o are randomly selected from field Z/pZ and $$X'=e(H,G_2)^t \cdot e(B,G_2)^u \cdot e(K,G_2)^v \cdot e(K,Y)^w$$

$$U'=[t+o]G$$

$$V'=[o]S$$

$$W'=[o]T$$

are generated to use (X',U',V',W') as commitment 307.

Next, by using challenge-value generating device 308, challenge value 309 having the following content is generated.

$$c=\text{Hash}(p,G\_1,G\_2,G\_T,G,\phi,Y,S,T,H,K,B,U,V,W,X',V',W',U',m)$$

Then, using response generating device 310, $$x'=cx_U+t$$

$$y'=cy_U+u$$

$$z'=c(z_U-qy_U)+v$$

$$q'=-cq+w$$

$$r'=cr+o$$

are generated to use (x,y',z',q',r') as response 311.
[End of Knowledge-Proof-Statement Generation]
Group signing device 300 outputs (B,U,V,W,c,x',y',z',q',r') as group signature 313 for message m through group-signature output device 312.

Emobidment 4

Group Signing Device 400

Figure 4:
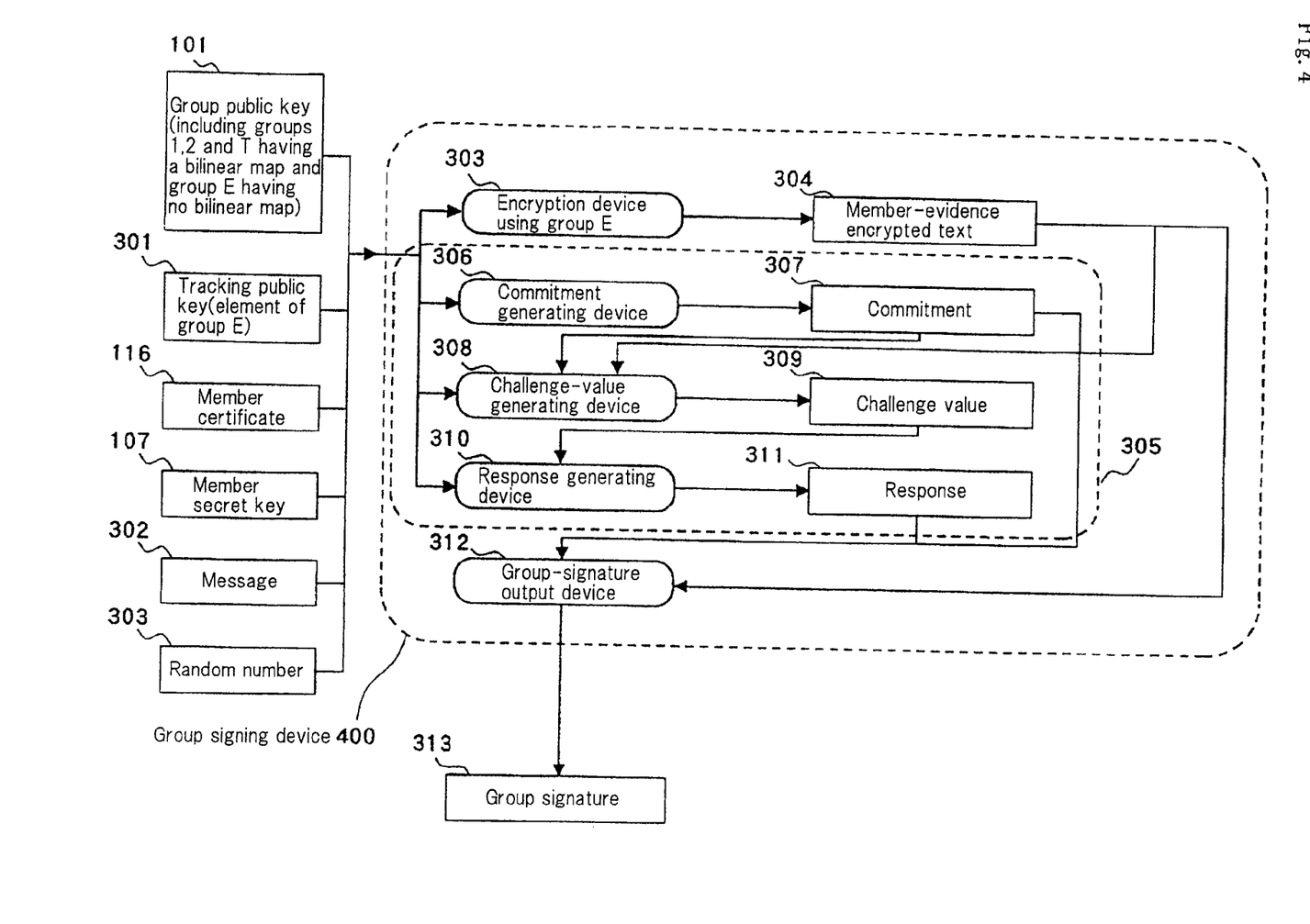
FIG. 4 shows the configuration of the group signing device in embodiment 4 of the present invention.

FIG. 4 is a block diagram to show the configuration of group signing device 300 according to the present invention.

Group signing device 400 has the same configuration as group signing device 300 shown in FIG. 3 but differs only in that the group signature to be output contains commitment (B,U,V,W,X',U',V',W',x',y',z',q',r').

Emobidment 5

Group-Signature Verifying Device 500

Figure 5:
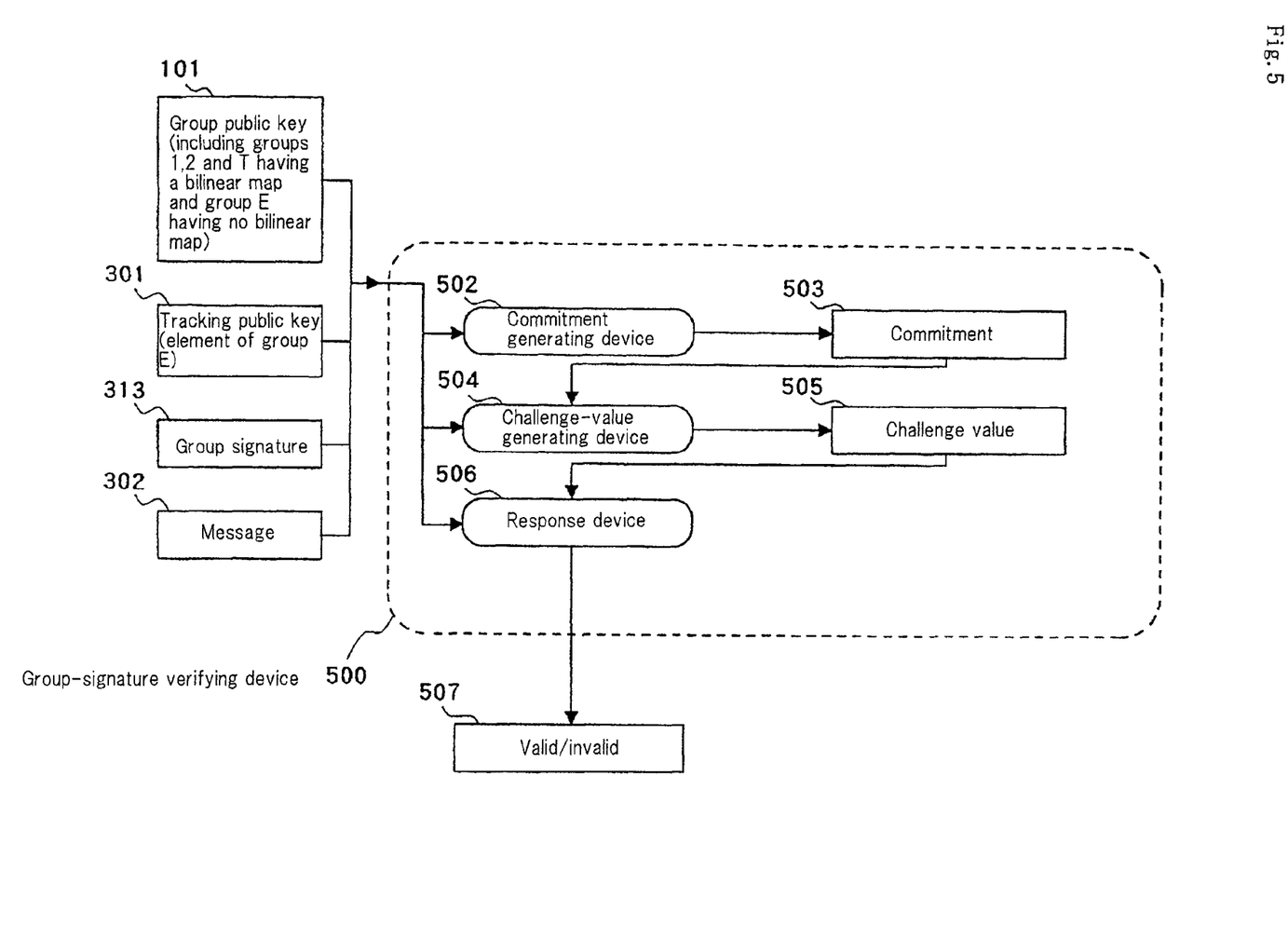
FIG. 5 shows the configuration of the group-signature verifying device in embodiment 5 of the present invention.

FIG. 5 is a block diagram to show the configuration of group-signature verifying device 500 according to the present invention.

Group-signature verifying device 500, which is input with group public key 101, tracking public key 301, message 302, and group signature 313 and outputs valid/invalid 507, comprises commitment generating device 502, commitment 503, challenge-value generating device 504, challenge value 505, and response device 506.

Moreover, group-signature verifying device 500 is made up of a general-purpose computer system which includes an input device, an output device, a storage device, and a control device, wherein commitment 503 and challenge value 505 are stored in memory. Further, devices other than these are also virtually made up of in the computer system.

Group-signature verifying device 500 is input with group public key 101, tracking public key 301, message 302 (*m*), and group signature 313 (B,U,V,W,c,x',y',z',q',r').

Commitment generating device 502 generates commitment 503 (X',U',V',W') having following content.

$$X'=e(H,G_2)^{(x')}e(B,G_2)^{(y')}e(K,G_2)^{(z')}e(K,Y)^{(q')}(e(G_1,G_2)/e(B,Y))^{(c)}$$

$$U'=[x'+r']G-[c]U$$

$$V'=[r']S-[c]V$$

$$W'=[r']T-[c]W$$

Challenge-value generating device 504 calculates challenge value 505 having following content.

$$c'=\text{Hash}(p,G\_1,G\_2,G\_T,G,\phi,Y,S,T,H,K,B,U,V,W,X',V',W',U',m)$$

Response device 506 verifies if challenge value c' generated by challenge-value generating device 504 corresponds to c included in group signature and, if there is a correspondence, outputs "valid" as the output of valid/invalid 507 and if not, outputs "invalid."

Emobidment 6

Group-Signature Verifying Device 600

Figure 6:
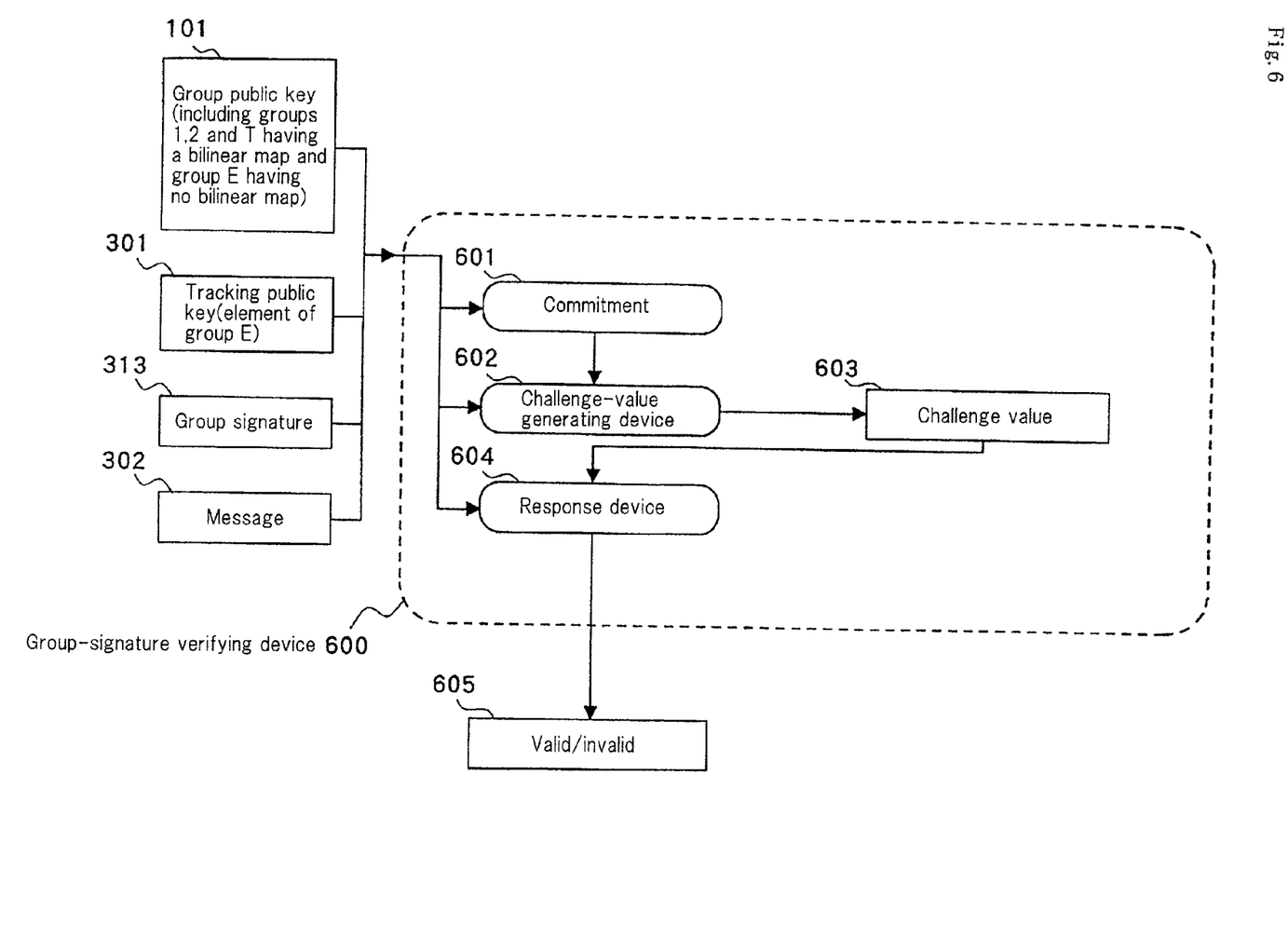
FIG. 6 shows the configuration of the group-signature verifying device in embodiment 6 of the present invention.

FIG. 6 is a block diagram to show the configuration of group-signature verifying device 600 according to the present invention.

Group-signature verifying device 600, which is input with group public key 101, tracking public key 301, message 302, and group signature 313 and outputs valid/invalid 605, comprises commitment 601, challenge-value generating device 602, challenge value 603, and response device 604. Commitment 601, challenge-value generating device 602, challenge value 603, and response device 604 are similar to commitment 503, challenge-value generating device 504, challenge value 505, and response device 506 shown in FIG. 5.

The way in which group-signature verifying device 600 differs from group-signature verifying device 500 shown in FIG. 5 is: that the group signature to be input is (B,U,V,W,X',U',V',W',x',y',z',q',r'); that, (X',U',V',W') included in the group signature is used as commitment 601 without using the commitment generating device; and that challenge value 603 (*c'*) which is generated by response device 604 using challenge-value generating device 602 is used and, if all of the following $$X'=e(H,G_2)^{(x')}e(B,G_2)^{(y')}e(K,G_2)^{(z')}e(K,Y)^{(q')}(e(G_1,G_2)/e(B,Y))^{(c')}$$

$$U'=[x'+r']G-[c']U$$

$$V'=[r']S-[c']V$$

$$W'=[r']T-[c']W$$

are satisfied, "valid" is output as the output of valid/invalid 605 and, if any one of them is not satisfied, "invalid" is output.

Emobidment 7

Tracking Device 700

Figure 7:
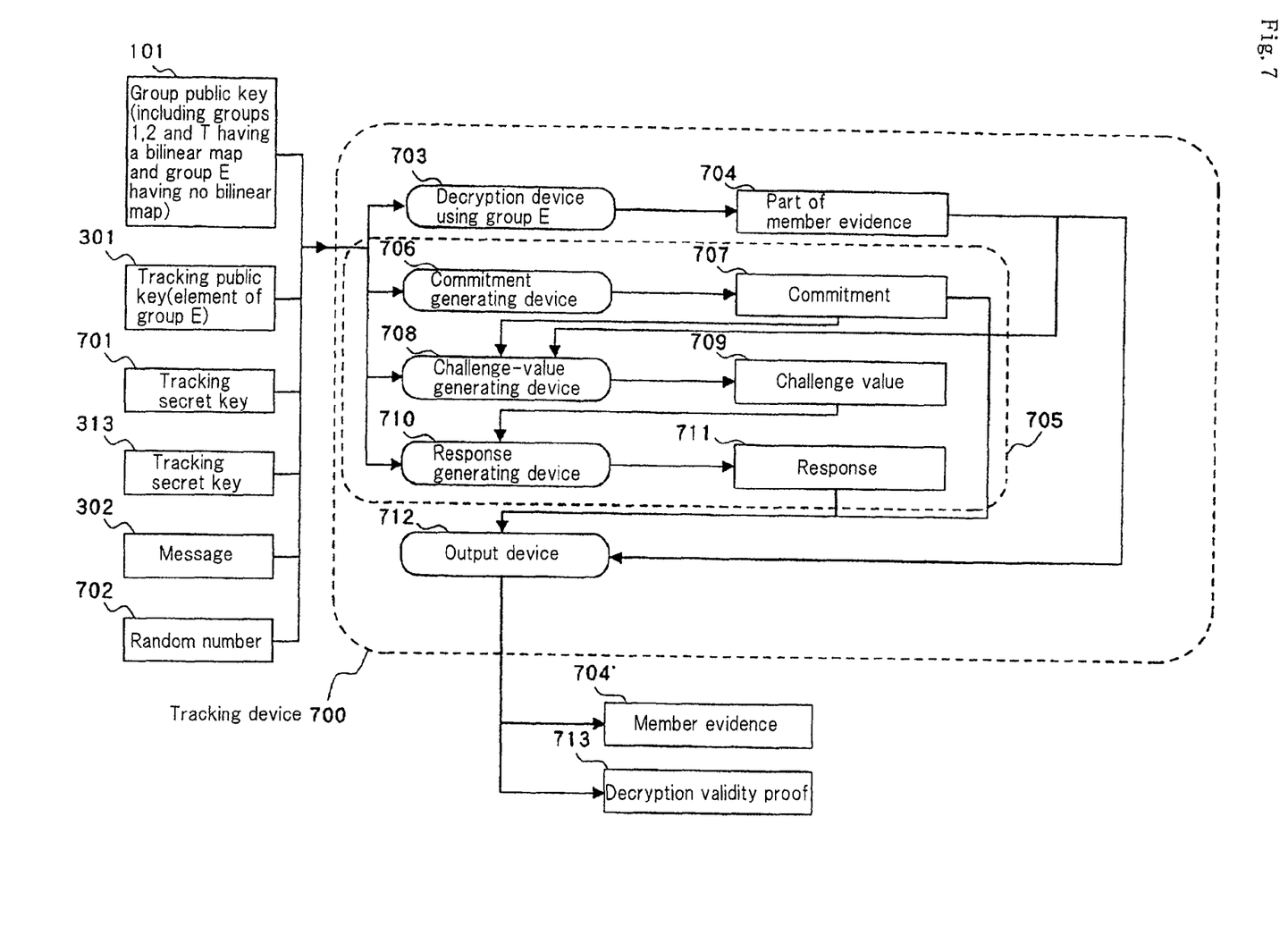
FIG. 7 shows the configuration of the tracking device in embodiment 7 of the present invention.

FIG. 7 is a block diagram to show the configuration of tracking device 700 according to the present invention.

Tracking device 700, which is input with group public key 101, tracking public key 301, message 302, group signature 313, tracking secret key 701, and random number 702 and outputs member evidence 704' and decryption validity proof 713, comprises decryption device 703 using group E, part of member evidence 704, commitment generating device 706, commitment 707, challenge-value generating device 708, challenge value 709, response generating device 710, response 711, and output device 712.

Moreover, tracking device 700 is made up of a general-purpose computer system which includes an input device, an output device, a storage device, and a control device, wherein part of member evidence 704, commitment 707, challenge value 709, and response 711 are stored in memory. Further, devices other than these are also virtually configured in the computer system.

Furthermore, decryption proof device 705 is made up of commitment generating device 706, commitment 707, challenge-value generating device 708, challenge value 709, response generating device 710, response 711, from among the above described constituents.

Tracking device 700 is input with group public key 101, tracking public key 301, tracking secret key 701, message 302 ($m$), group signature 313 (B,U,V,W,c,x',y',z',q',r'), and random number 702.

Decryption device 703 using group E generates part of member evidence 704 having following content, $$Q=U-[1/s]V$$

from the encrypted text of part of member evidence and tracking secret key 701.

Commitment generating device 706 selects unknown r of field Z/pZ using random number 707 to generate commitment 707 having following content.

$$V''=[r]V$$

$$G''=[r]G$$

Challenge-value generating device 708 generates challenge value 709 having following content.

$$c''=\text{Hash}(p,G\_1,G\_2,G\_T,G,\phi,Y,S,T,H,K,B,U,V,W,X',V',W',U',m,V'',G'')$$

Response generating device 710 generates response 711 having following content.

$$r''=c''/s+r$$

Output device 712 outputs part of member evidence 704 (Q) as member evidence 704' using (V'',G'',r'') as decryption validity proof 713.

Emobidment 8

Group Signing System 800

Figure 8:
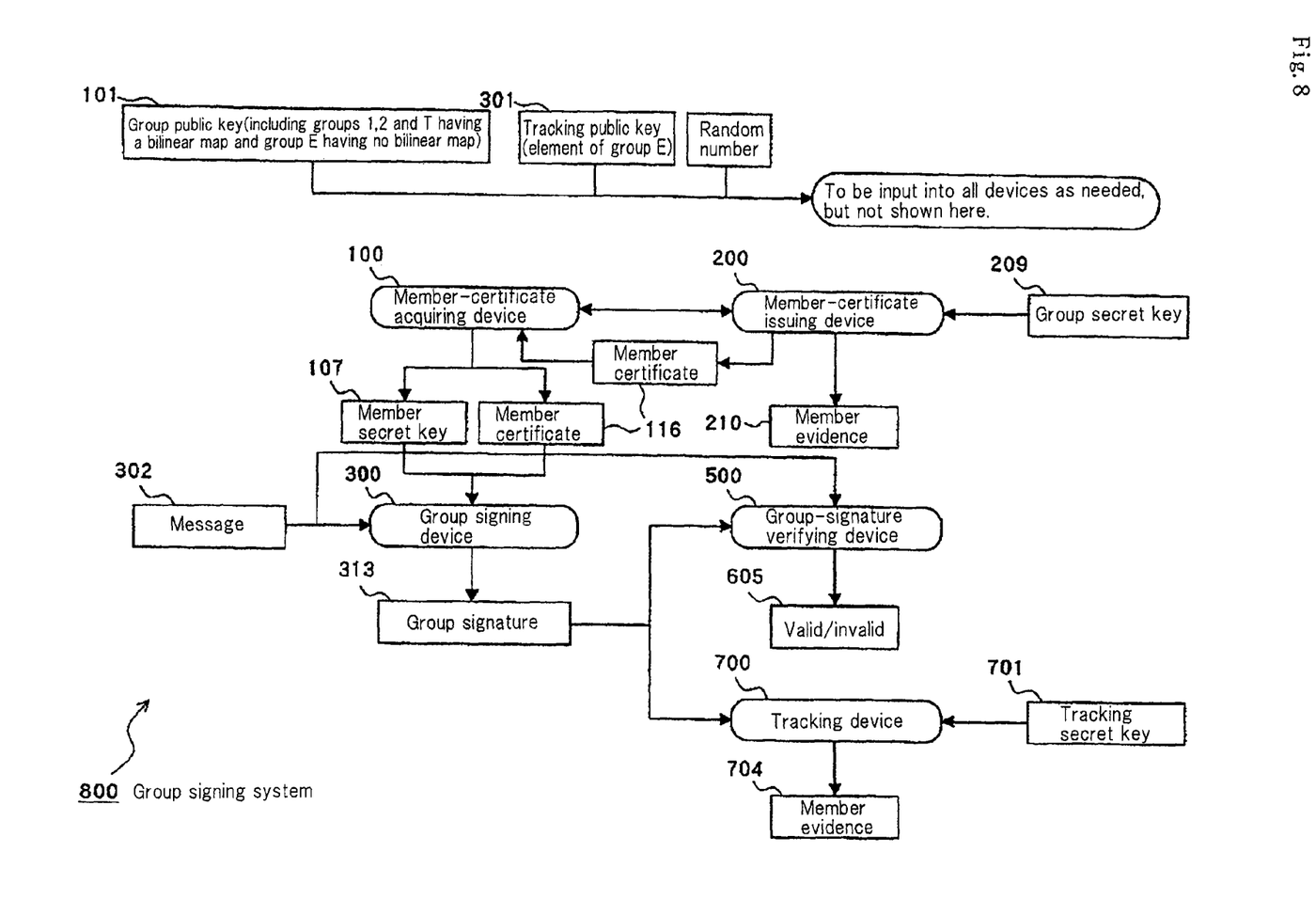
FIG. 8 shows the configuration of the group signing system in embodiment 8 of the present invention.

FIG. 8 is a block diagram to show the configuration of group signing system 800 according to the present invention.

This embodiment is a system comprising member-certificate acquiring device 100 shown in FIG. 1, member-certificate issuing device 200 shown in FIG. 2, group signing device 300 shown in FIG. 3, group-signature verifying device 500 shown in FIG. 5, and tracking device 700 shown in FIG. 7. Group signing device 300 may be group signing device 400 shown in FIG. 4, and also group-signature verifying device 500 may be group-signature verifying device 600.

Member-certificate acquiring device 100 communicates with member-certificate issuing device 200 to acquire member certificate 116 and member secret key 107.

Group signing device 300 is input with message 302, group public key 101, tracking public key 301, member certificate 116 acquired by member-certificate acquiring device 100, and acquired member secret key 107, and group signing device 300 outputs group signature 313 for message 302.

Group-signature verifying device 500 is input with message 302, group public key 101, tracking public key 301, message 302, and group signature 313, and verifies whether group signature 313 is a valid group signature for the message, and outputs valid/invalid 605 indicating the result thereof.

Tracking device 700 is input with tracking public key 301, group signature 313, and tracking secret key 701, and outputs member evidence 704 indicating a member who has generated the group signature.

The invention claimed is:

1. A group signing device, which is input with a group public key, a tracking public key, a member certificate, a member secret key, and a message and which outputs a group signature for said message, said group signing device comprising:
an encryption device for creating an encrypted text in which part of member evidence generated from said member secret key is encrypted by said tracking public key from:
a) said group public key including a description for four groups:
(1) group 1, group 2, group T, and group E, of a same order number,
(2) a description of bilinear mapping from said group 1 and said group 2 to said group T,
(3) respective generators of said group 1, said group 2, said group T, and said group E, and
(4) a signature public key of a signature scheme utilizing said group 1, said group 2, and said group T;
b) said tracking public key comprising an element of said group E; and
c) said member secret key; and
a knowledge-proof-statement generating device comprising a processor which generates a knowledge proof statement which is data for proving that a secret key encrypted into said encrypted text and a signature for said secret key can be calculated from input data, wherein said group signature to be output includes said knowledge proof statement generated by said knowledge-proof-statement generating device, and
wherein said group E is a group different from said group 1, said group 2, and said group T for solving a Diffie-Hellman discrimination problem.

2. The group signing device according to claim 1, characterized in that said knowledge-proof-statement generating device comprises:
a commitment generating device which is input with said group public key, said tracking public key, said member secret key, said member certificate, and said random number and generates a commitment to encryption which is data for proving knowledge of a random number for encryption, and a commitment to a member certificate which is data for proving knowledge of a signature and member secret key, to output said commitment to encryption and said commitment to a member certificate as a commitment;
a challenge-value generating device which is input with said group public key, said tracking public key, said encrypted text, and said commitment and outputs a hash value of the foregoing values as a challenge value; and
a response generating device which is input with said group public key, said member secret key, said member certificate, said random number, and said challenge value, and outputs a response of encryption and a response of member certification as a response.

3. The group signing device according to claim 2, characterized in that said group signature comprises said encrypted text, said commitment, and said response.

4. The group signing device according to claim 2, characterized in that said group signature comprises said encrypted text, said challenge value, and said response.

5. A group signing system, comprising the group signing device according to claim 1, characterized in that said member-certificate acquiring device communicates with said member-certificate issuing device to acquire a member certificate and a member secret key; inputs the acquired said member certificate, the acquired said member secret key, a message, a group public key, and a tracking public key into said group signing device to acquire a group signature for said message; and inputs said message and the acquired group signature into said group-signature verifying device to verify that the acquired group signature is a valid group signature for said message and to input said group signature into said tracking device thereby outputting a member evidence representing the member which has generated the group signature.

6. A group-signature verifying device, which is input with a group public key, a tracking public key, a message, and a group signature, and judges whether said group signature is a valid group signature for said message to output a valid indicator or an invalid indicator, characterized in that when input with:
  a) said group public key which includes a description for four groups:
    (1) group 1, group 2, group T, and group E, of a same order number;
    (2) a description of bilinear mapping from said group 1 and said group 2 to said group T;
    (3) respective generators of said group 1, said group 2, said group T, and said group E; and
    (4) a signature public key of a signature scheme using said group 1, said group 2, and said group T;
  b) said tracking public key comprising an element of said group E; and
  c) said group signature including an encrypted text in which part of member evidence generated by a member secret key is encrypted by said tracking public key,
  said group-signature verifying device judges whether said group signature is a valid group signature for said message to output said valid indicator or said invalid indicator; and
  a knowledge-proof-statement verifying device comprising a processor which verifies that a knowledge proof statement is data to prove that a secret key which is used to generate said part of said member evidence encrypted into said encrypted text, and a signature for said secret key can be calculated from data input into said group-signature verifying device and from data included in said group-signature verifying device,
  said group signature includes said knowledge proof statement which has been verified by said knowledge-proof-statement verifying device, and
  said group E is a group different from said group 1, said group 2, and said group T for solving a Diffie-Hellman discrimination problem.

7. The group signing device according to claim 6, characterized in that said group signature comprises said encrypted text, said commitment, and said response, and said knowledge-proof-statement verifying device comprises:
  a challenge-value generating device which is input with said group public key, said tracking public key, said encrypted text, and said commitment, and outputs a hash value of the foregoing values as a challenge value; and
  a response verifying device which is input with said group public key, said tracking public key, said encrypted text, said commitment, said challenge value and said response, and outputs the valid indicator or the invalid indicator depending on whether or not these inputs satisfy a given equation, wherein
  the output of said response verifying device is output as the output of said group-signature verifying device.

8. The group-signature verifying device according to claim 6, characterized in that:
  said group signature comprises said encrypted text, said challenge value, and said response; and
  said knowledge-proof-statement verifying device comprises:
  a commitment generating device which is input with said group public key, said tracking public key, said response, and said challenge value, and outputs a commitment to encryption and a commitment to member certificate as a commitment; and
  a response verifying device which is input with said public key, said tracking public key, said encrypted text, and said commitment, and outputs the valid indicator or the invalid indicator depending on whether or not a hash value of the foregoing values corresponds to said challenge value, wherein
  the output of said response verifying device is output as the output of the group-signature verifying device.

9. A group signing system, comprising the group-signature verifying device according to claim 6, characterized in that said member-certificate acquiring device communicates with said member-certificate issuing device to acquire a member certificate and a member secret key; inputs the acquired said member certificate, the acquired said member secret key, a message, a group public key, and a tracking public key into said group signing device to acquire a group signature for said message; and inputs said message and the acquired group signature into said group-signature verifying device to verify that the acquired group signature is a valid group signature for said message and to input said group signature into said tracking device thereby outputting a member evidence representing the member which has generated the group signature.

* * * * *